May 23, 1939.  C. A. NERACHER ET AL  2,159,339
POWER TRANSMISSION
Filed Dec. 7, 1935 6 Sheets-Sheet 1
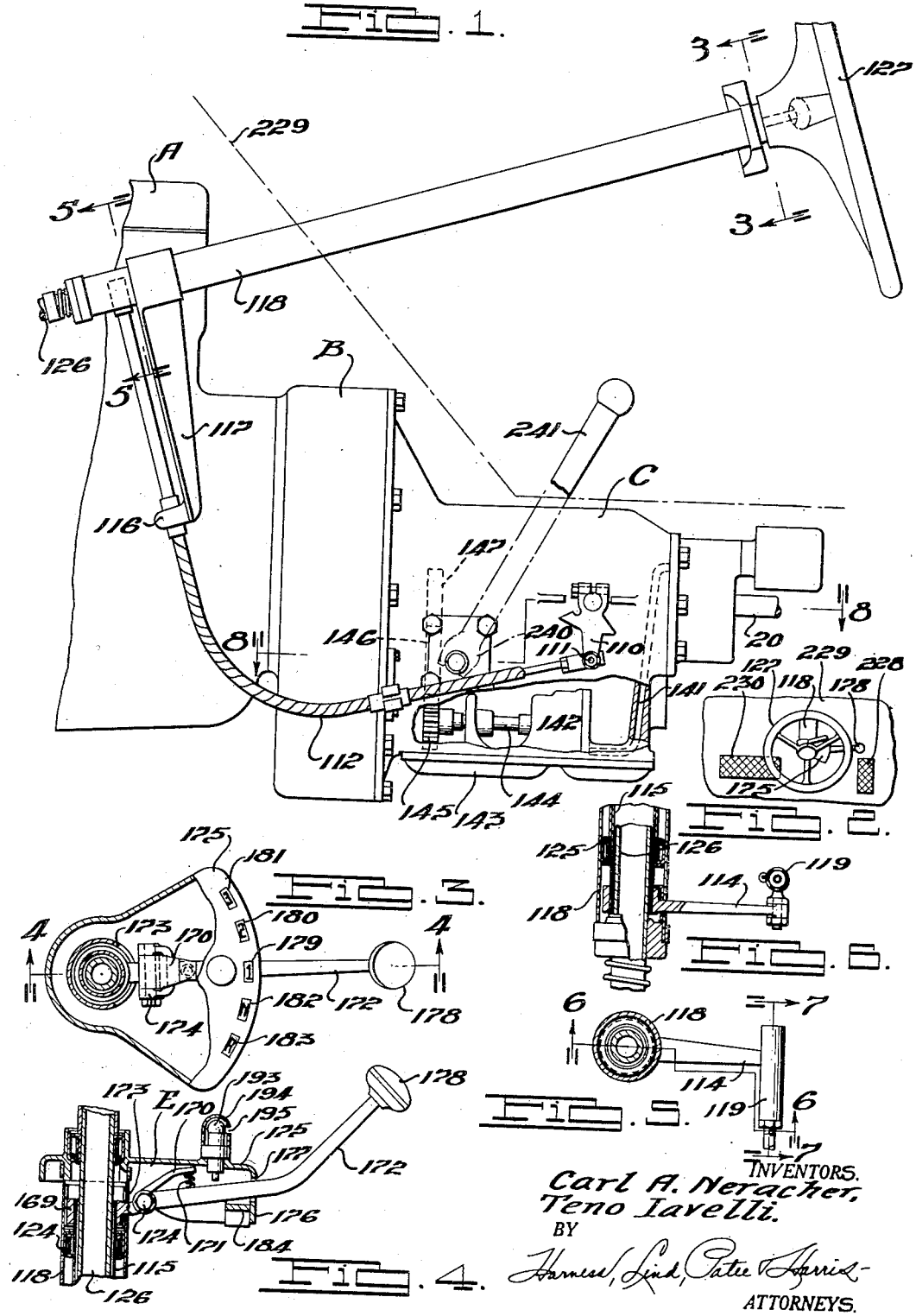

May 23, 1939.   C. A. NERACHER ET AL   2,159,339
POWER TRANSMISSION
Filed Dec. 7, 1935   6 Sheets-Sheet 2
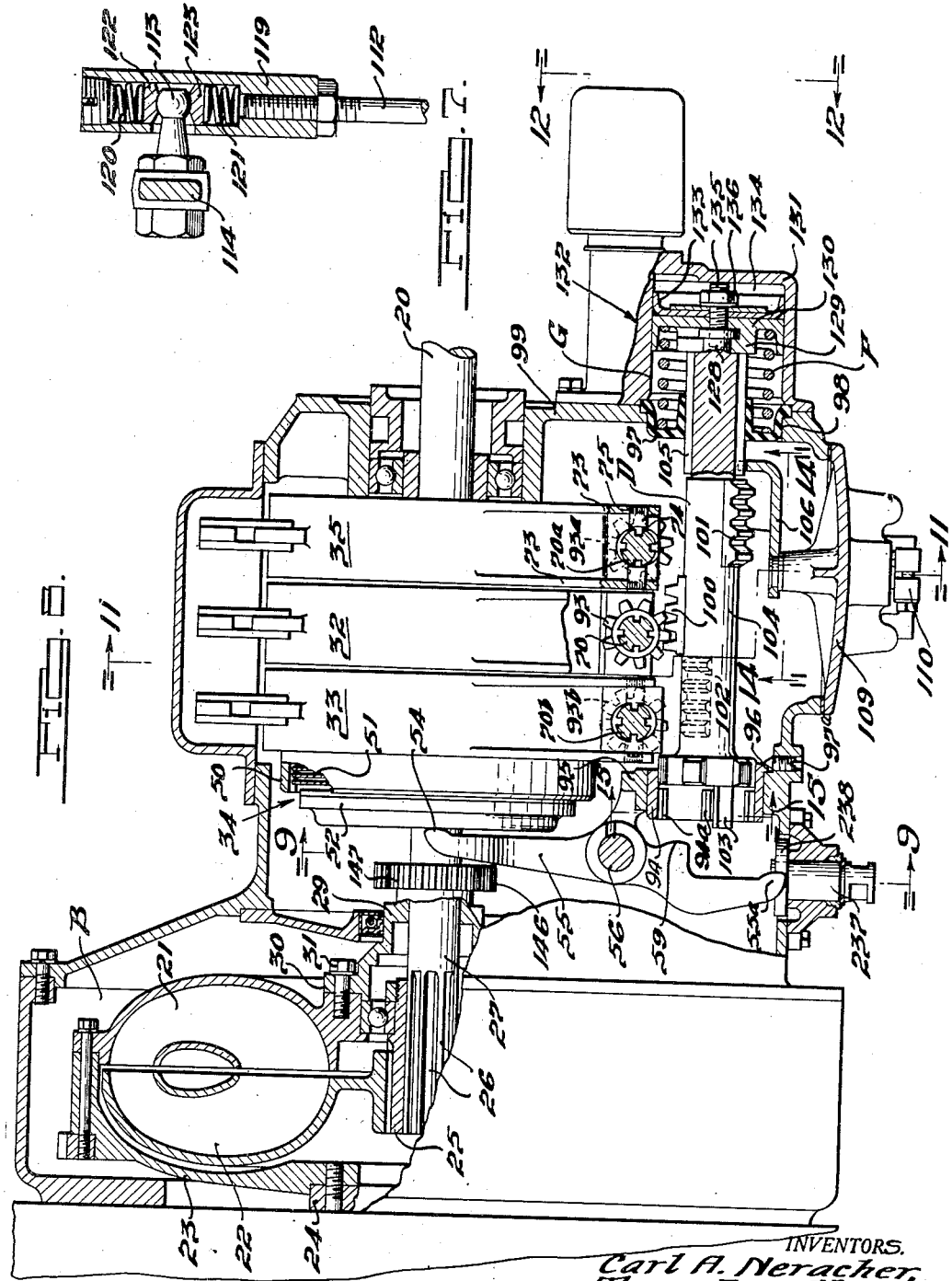
INVENTORS.
Carl A. Neracher,
Teno Iavelli.
BY
Harness, Dick, Pater & Harris
ATTORNEYS.

May 23, 1939.　　C. A. NERACHER ET AL　　2,159,339
POWER TRANSMISSION
Filed Dec. 7, 1935　　6 Sheets-Sheet 3
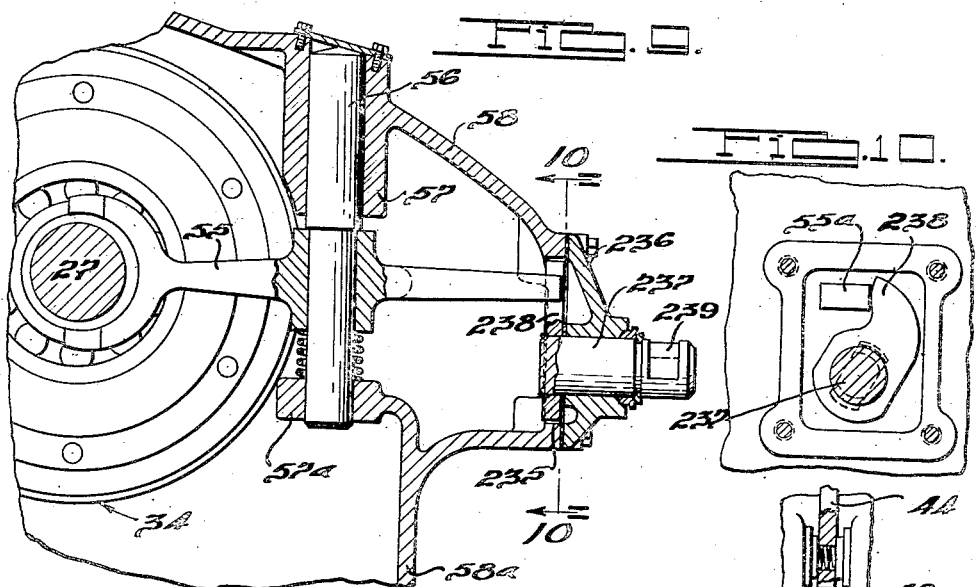
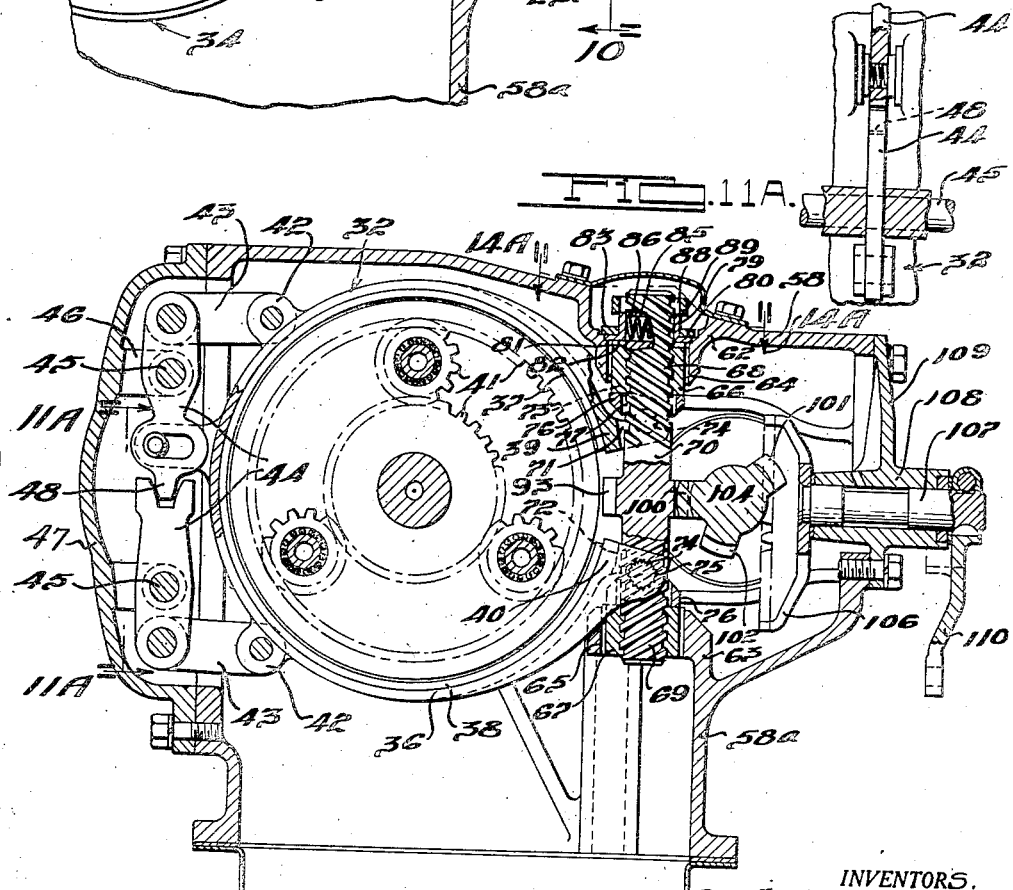
INVENTORS.
Carl A. Neracher,
Teno Lavelli.
BY
Harness, Dind, Peter & Harris
ATTORNEYS.

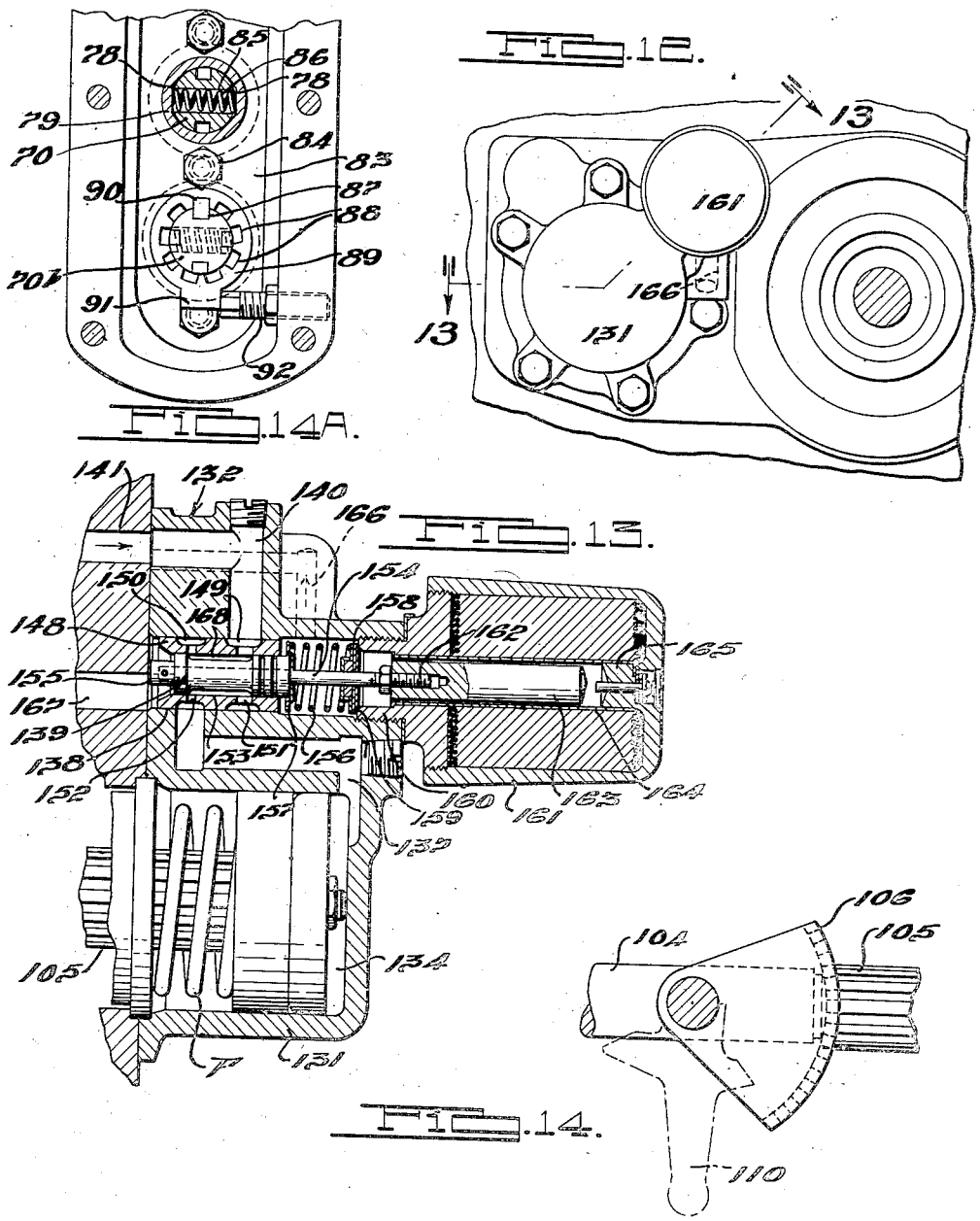

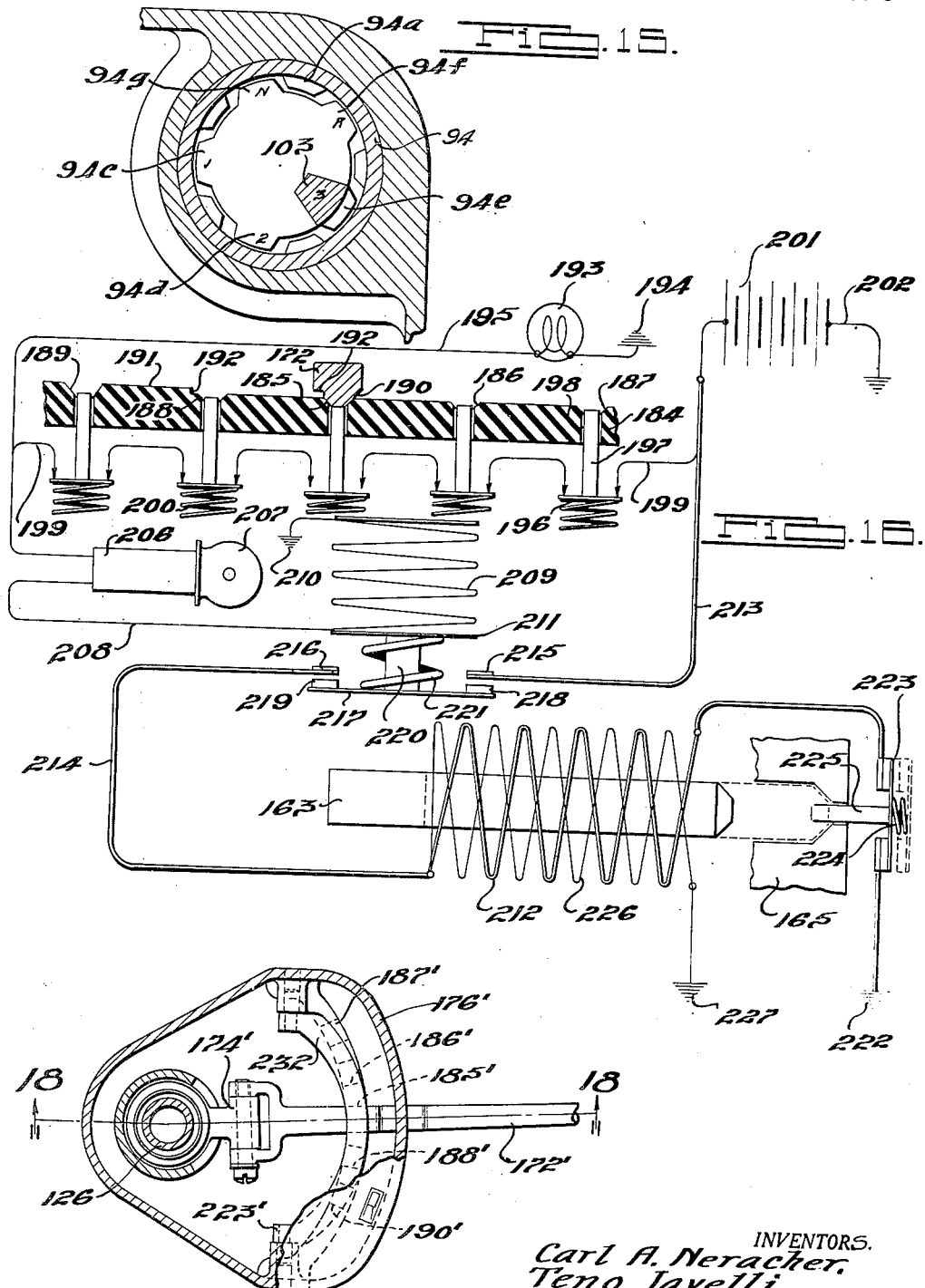

May 23, 1939.   C. A. NERACHER ET AL   2,159,339
POWER TRANSMISSION
Filed Dec. 7, 1935   6 Sheets—Sheet 6

INVENTORS.
Carl A. Neracher,
Teno Lavelli.
BY
Harness, Dill, Patee & Harris.
ATTORNEYS.

Patented May 23, 1939

2,159,339

UNITED STATES PATENT OFFICE 2,159,339

POWER TRANSMISSION

Carl A. Neracher, Detroit, and Teno Iavelli, Dearborn, Mich., assignors to Chrysler Corporation, Highland Park, Mich., a corporation of Delaware Application December 7, 1935, Serial No. 53,284

46 Claims. (Cl. 74—262)

REISSUED

FEB 13 1940

This invention relates to power transmission mechanism and refers more particularly to improvements in power transmission systems especially adapted for use in connection with motor vehicles, although not necessarily limited thereto.

Our invention, in certain more limited aspects, provides improvements in the drive and control for power transmission systems having epicyclic or planetary gear trains adapted to provide the desired speed ratios between the vehicle engine and driving ground wheels.

One object of our invention resides in the provision of an improved selector and actuating mechanism for obtaining the several speed ratios provided by the speed changing mechanism, the latter being preferably of the planetary gear type although not necessarily limited thereto in the broader aspects of our invention.

A further object of our invention resides in the provision of improved controls and actuating mechanism for selecting and manipulating the various gear trains of a transmission, particularly a planetary type of transmission, whereby means is provided responsive in an improved manner to manual control for automatically and quickly bringing about a complete cycle of gear ratio change.

In carrying out the above objects of our invention, which provides for improvements over the transmission control system disclosed in our copending application Serial No. 752,948 filed November 14, 1934, we provide a common actuator or prime mover preferably of the fluid pressure type for applying the necessary force to the braking devices of the planetary trains in order to control the rotation of the desired customary control drums.

Our selector mechanism is under manual control by the vehicle driver for causing the common actuator to quickly and efficiently apply a braking force to the proper drum. This actuator, when of the fluid pressure type, is operated by oil pressure, air pressure either above or below atmospheric pressure, or other equivalent systems. We prefer, according to the teachings of this phase of our invention, to provide for energizing the actuator by oil pressure.

A further object of our invention resides in the provision of an improved selector control mechanism for use with change speed mechanisms of the character aforesaid. We have provided a manually operable selector element for controlling all speed changes, including a neutral setting and reverse, our improved mechanism providing for rapid speed ratio changes in automatic response to manipulation of the selector element between any of its positions of control.

An additional object of our invention is to provide an improved transmission system adapted for manual control with a minimum of effort and a maximum of safety to the operating parts, our system of controls being arranged for manipulation with a minimum of effort and attention on the part of the vehicle driver, thereby increasing the safety of vehicle driving and the comfort of the driver.

In carrying out the above objects of our invention we have provided an electrical control for a fluid pressure supply valve, the arrangement insuring release of a driving speed ratio immediately on manual adjustment of the selector element to a new setting. Our mechanism is so constructed and arranged that the fluid pressure operator, acting to provide a selected condition of drive, is immediately released at the start of an adjusting movement of the manual selector element thereby enabling us to utilize the balance of the adjusting movement of the manual selector element to effect selection of a new set of speed ratio gears or a new condition in the transmission, preferably through the intermediary of a common selector operating element. Such arrangement, among other things, reduces the time required to produce changes in the transmission settings, prevents danger of jamming the control parts, and relieves the operator of any conscious effort timing the manual movement of the selector element with other parts of the system.

A further object of our invention is to provide an improved arrangement of motor vehicle controls providing for improved ease of driving the vehicle particularly for city driving where frequent starting and stopping is required.

Another object of our invention is to provide a novel manually operable transmission control auxiliary or supplemental to the manual or main transmission controlling system whereby, on any failure of the latter system, the auxiliary control may be readily operated by simplified and inexpensive means under manual control to effect a drive through the transmission until the main system is repaired or in preference to use of the main system.

A planetary type of transmission presents a number of advantages over the more conventional sliding gear types of transmissions, and our invention is therefore primarily directed toward planetary types of transmissions and power transmission systems employing planetary gear speed ratio controlling devices although, as aforesaid, the fundamental principles of our invention may, if desired, be employed in connection with transmissions of other types including the aforesaid sliding gear types of transmissions. By way of example in connection with the aforesaid advantages of the planetary transmission over more conventional types, it may be noted that the planetary transmission especially when used in conjunction with a fluid type of clutch between the engine and transmission permits gear changes without the necessity of releasing the heretofore conventional main clutch between the engine and transmission so as to obtain relatively quick gear changes and faster acceleration of the motor vehicle. This is made possible by reason of the fact that the braking devices associated with the planetary gear trains may quickly operate, the fluid clutch smoothing the shock of the gear change by reason of its inherent slipping qualities.

Further objects and advantages of our invention will be apparent from the following detailed description of a preferred embodiment of our invention, reference being had to the accompanying drawings in which:

Fig. 1 is a side elevational view somewhat diagrammatic in form illustrating our power transmission mechanism as a whole, a portion of the transmission casing being broken away to illustrate the fluid pressure pump.

Fig. 2 is a detailed plan view looking down on the vehicle steering wheel and portion of the toe board adjacent thereto illustrating the vehicle control pedals.

Fig. 3 is a detail sectional view showing the manually controlled selector mechanism with parts of the casing structure broken away, the section being taken as indicated on the line 3—3 of Fig. 1.

Fig. 4 is a sectional view of the Fig. 3 mechanism taken along the line 4—4 of Fig. 3.

Fig. 5 is a detail sectional plan view along the line 5—5 of Fig. 1 showing the steering post mounting for certain of the selector operating connections.

Fig. 6 is a fragmentary sectional elevational view taken as indicated by the line 6—6 of Fig. 5.

Fig. 7 is an enlarged detail sectional view taken along the line 7—7 of Fig. 5.

Fig. 8 is an enlarged sectional plan view of the transmission and fluid clutch, the view being taken as generally indicated by the line 8—8 in Fig. 1.

Fig. 9 is a detail sectional elevational view taken along the line 9—9 of Fig. 8 illustrating the operating mechanism for the direct speed controlling device.

Fig. 10 is a detail sectional view taken along the line 10—10 of Fig. 9.

Fig. 11 is a sectional elevational view through the transmission illustrating one of the speed ratio controlling devices and parts associated therewith, the section being taken along the line 11—11 of Fig. 8.

Fig. 11a is a detail sectional view taken as indicated by line 11a—11a of Fig. 11.

Fig. 12 is a rear elevational view illustrating the housing mechanism for the fluid pressure operator and associated control valve.

Fig. 13 is an enlarged sectional view taken as indicated by the line 13—13 of Fig. 12.

Fig. 14 is a detail sectional elevational view taken along the line 14—14 of Fig. 8.

Fig. 14a is a sectional plan view of a portion of the transmission taken along line 14a—14a of Fig. 11, the section being taken lower at the inner screw shaft to show the supporting spring.

Fig. 15 is a detail sectional elevational view taken along the line 15—15 of Fig. 8.

Fig. 16 is a diagrammatic view illustrating our electrical system of control between the manually operated selector element and the fluid pressure control valve mechanism.

Fig. 17 is a view corresponding in general to Fig. 3 but illustrating a modified structure.

Figure 18:
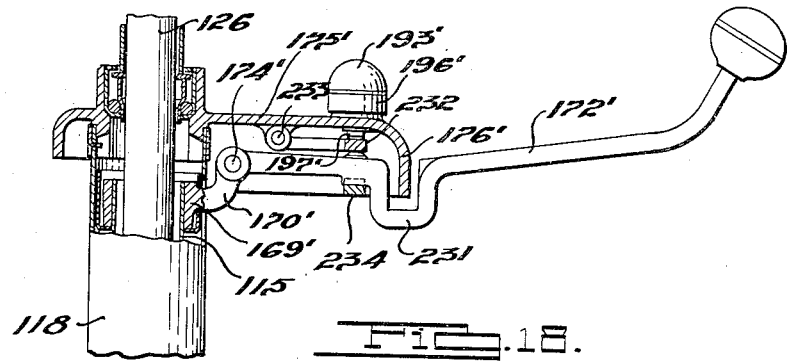
Fig. 18 is a sectional view of the Fig. 17 structure, the section being taken as indicated by the line 18—18 of Fig. 17.

Referring to the drawings, we have illustrated our invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through a power take-off shaft 20, which, as usual, may extend rearwardly of the vehicle to drive the usual ground wheels (not shown).

The clutch B may be of any suitable construction for controlling the drive between engine A and transmission C, this clutch being illustrated in Fig. 8 in the form of a fluid coupling type having the usual driving and driven cooperating vane members 21 and 22 respectively. The driving vane member 21 is carried by the engine flywheel 23, the latter being connected as usual with the rear end of the engine crankshaft 24. The driven vane member 22 is splined to a hub 25 which in turn is splined at 26 on the forward end of the driven shaft 27. This driven shaft extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the pump is idling. It is therefore preferred to provide a pump drive from the driving clutch member 21 rather than the driven clutch member 22 inasmuch as the latter may be stationary under certain conditions of vehicle operation such as when the vehicle is standing still with the engine idling.

This pump drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving vane member 21, the sleeve 29 will be rotatably driven from the engine crankshaft 24 and flywheel 23. The pump drive from sleeve 29 will be more apparent hereinafter.

We have illustrated the fluid type of clutch B since a clutch of this character has a number of advantages in connection with a transmission of the planetary gear type C and in further connection with our arrangement of vehicle driving controls which will be presently described more in detail. Among the advantages of the fluid type of clutch are the provision of a smooth drive for the vehicle through the planetary transmission, relatively high power driving efficiency, automatic release of the drive between the engine and transmission when the engine is idling, and with the transmission manipulated to establish one of its driving gear ratio settings, and other well known favorable characteristics. We desire to point out, however, that other types of clutches may be employed to control the drive between engine A and transmission C within the broader aspects of our invention. For example, the well known type of friction clutch may be employed and manually operated or automatically operated by the well known commercial type of vacuum clutch releasing mechanism as will be readily understood.

We have illustrated the change speed transmission C as the epicyclic or planetary type, this general form of transmission being well known in the art and, as usual, includes a plurality of transmission speed ratio controlling clutches or brakes 32, 33, 34 and 35, these braking controlling devices being respectively adapted to actuate the transmission in its first speed ratio or low gear, second speed ratio or intermediate gear, third speed ratio or direct drive, and reverse drive. Other speeds may be provided as desired.

The typical brake device 32 illustrated in Fig. 11 consists of an outer band 36 which substantially surrounds the rotary element or drum 37, the band being provided with friction braking material 38 carried by the band and adapted for frictional engagement with the drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 11 the low speed ratio braking device 32 is illustrated in its inoperative position whereby the drum 37 is free to rotate through operation of the planetary gear set 41 somewhat diagrammatically illustrated in association with the drum 37. When the braking device 32 is actuated by contracting the band 36, the drum 37 is held against rotation, the driven shaft 20 in such instance being operated through the planetary gearing 41 to provide the low speed drive for the motor vehicle.

In order to anchor the band 36 and to substantially equalize the braking forces applied to drum 37 around the periphery thereof and thereby substantially avoid a tendency toward lateral loading of the drum and planetary gearing transverse to the axis of the drum, we have provided the band with a circumferentially spaced pair of anchoring flanges 42. These flanges are connected through links 43 with the levers 44 pivotally mounted at 45 with the supporting bracket 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and 44.

The third speed clutching controlling device 34 is arranged for a direct drive through the transmission and differs somewhat from the braking devices 32, 33 and 35 in that the controlling device 34 has its rotary controlling element 50 adapted for clutching action in a well known manner by frictional engagement through the discs 51 by an axially movable clutching member 52. The latter clutching member is thus engaged by the yoked end 54 of an actuating lever 55 pivotally mounted by a pin 56 (see Fig. 9) supported in journal brackets 57, 57a formed with the transmission top housing portion 58 and the side housing or casing portion 58a. respectively. On the opposite side of pivot 56 the lever 55 is provided with a step actuating portion 59, the purpose of which will presently be more apparent. The lever 55 is also provided with an end actuating portion 55a, the function of which will be presently described.

The transmission casing portions 58 and 58a are respectively provided with the vertically spaced inwardly extending supporting brackets 62 and 63, respectively, these brackets being formed with coaxial splined openings 64 and 65, respectively. Splined within these openings are the nut 66 and 67 which are axially and oppositely threaded to receive the correspondingly threaded ends 68 and 69 of an operating oscillatory shaft or screw 70.

The shaft 70 extends through openings 71 and 72, respectively, formed to open laterally in the aforesaid band ends 39 and 40, these openings having considerable clearance with shaft 70 so as not to bind on the shaft when the band is contracted and expanded. In order to transmit the thrust of the nuts 66 and 67 to the flanges 39 and 40 so as to relieve distorting loads on the shaft 70 and parts associated therewith, we have provided the following mechanism. Each of the band ends, such as the end 39, for example, is provided with a pair of longitudinally spaced side flanges 73, each flange carrying a support pin 74 secured to its associated flange 73 by the knurled engagement 75. Rockingly seated on each pair of pins 74 is a rock plate 76, the latter in this instance being engaged by the nut 66. A similar rock plate 76 is likewise associated between the nut 67 and the associated band end 40, each rock plate being located between the flanges 73 of the associated band end and each rock plate having a clearance indicated at 77 with the shaft 70.

Near the upper end of screw shaft 70, the latter is surrounded by a supporting bushing 79 having a lower flange 80 seated on an annular shoulder 81 of bracket 62, there being always a clearance 82 between shoulder 80 and nut 66. Bushing 79 has diametrically opposite flats 78 best seen in Fig. 14a. In order to hold the bushings 79 associated with the shafts of the various braking devices downwardly on their respective annular seats 81, we have provided a longitudinally extending plate 83 suitably secured at 84 to the casing 58 intermediate adjacent brackets 62.

Shaft 70 has a transversely extending bore 85, a relatively heavy spring 86 being fitted within the bore 85 and exerting outward pressure at its opposite ends against the flats 78 of bushing 79. The frictional engagement provided at the ends of spring 86 with bushing 79 floatingly supports the screw shaft 70 and associated end portions of the band and affords a means of compensating for manufacturing tolerances in the assembly and in preventing a drag of the brake band against the rotatable drum.

In order to provide a ready means for taking up brake band wear, the upper end of screw shaft 70 is provided with a slot 87 adapted to register with any one of a series of corresponding slots 88 formed in a collar 89 which surrounds the upper end of the shaft. A key 90 is adapted for insertion in the shaft slot 87 and any one of the bushing slots 88 whereby the shaft may be rotated relative to bushing 89 and then locked therewith by reason of the key 90. The bushing 89 has a lug 91 projecting laterally therefrom for engagement with a threadedly adjustable stop 92 adapted to limit rotative movement of shaft 70 during the release of the band.

The operating shaft 70 of the low speed braking device 32 has its portion thereof intermediate the band ends 39 and 40 formed with a gear 93, the means for oscillating shaft 70 through the gear 93 being hereinafter more particularly described.

In the operation of the low speed controlling device 32 as thus far described, it will be apparent that when the shaft 70 is given a rotary movement, such movement operates through the oppositely threaded ends 68 and 69 of the shaft 70 to cause the nuts 66 and 67 to move inwardly toward each other in their splined openings 64 and 65 respectively, this movement acting through the rocking plates 76 and pins 74 to contract the band ends 39 and 40 whereby the low speed drum 37 has its rotation checked for establishing the low speed drive through the transmission. When the shaft 70 is rotated in the opposite direction, the nuts 66 and 67 are moved away from each other and the band 36 is expanded to permit the drum 37 to again rotate and thereby relieve the drive through the transmission controlling device 32.

In order to avoid repetition we have not illustrated all of the details of the brake operated means associated with the controlling devices 33 and 35, it being understood that such operating means are similar to that described in connection with the controlling device 32. For convenience of reference the operating shaft or screw for the reverse speed braking device is designated as 70$^a$ and the corresponding shaft for the second speed braking device 33 is designated as 70$^b$. The gears associated with these screw shafts are respectively designated as 93$^a$ and 93$^b$. As will be more apparent presently, the gears 93, 93$^a$ and 93$^b$ and lever end 55$^a$ are adapted to be selectively operated in order to selectively control the engagement and release of the respective speed ratio controlling devices 32, 35, 33 and 34.

We will next describe the common operating means or selector operating element which is adapted for selective engagement under manual control with the aforesaid screw gears, 93, 93$^a$ and 93$^b$ for respectively operating the speed ratio controlling devices 32, 35 and 33; also for operating the direct or third speed controlling device 34; and also for establishing a neutral condition in the transmission. Our present arrangement provides for simplification over that disclosed in our co-pending application aforesaid, a more compact arrangement of parts together with a shortening in the length of the transmission and a consequent saving in the weight and cost of the operating mechanism as a whole.

The transmission casing is adapted to support a pair of axially aligned bearings for receiving the reciprocating and oscillating rack or actuating shaft D. The forward bearing is provided by a bushing 94 non-rotatably received in an opening of a casing support bracket 95, the bushing being held against axial displacement forwardly by a bushing projection 96 and rearwardly by the set screw 97$^a$. The rear bearing is provided by a member 97 which is disposed in a suitable opening 98 in the rear end wall 99 of the transmission casing, the rear end of the actuating shaft D being also supported by a piston for reciprocating the shaft and which will presently be referred to in detail.

This actuating shaft D has a series of teeth forming a rack adapted to be brought into operative association with each of the screw gears, these racks being designated at 100, 101 and 102 for respectively operating the screw gears 93, 93$^a$ and 93$^b$. The forward end of shaft D is further provided with a third speed actuating projection 103 adapted for engagement with the lever shoulder 59 for operating the third speed controlling device 34. It will be noted that the racks and projection 103 are longitudinally spaced along the shaft D and that they are also spaced circumferentially of the shaft whereby upon progressive rotation of the shaft only one of the racks and the projection 103 will engage its associated screw gear or lever 55 at any time. In Figs. 8 and 11 it will be noted that the shaft D is positioned so that the low speed rack 100 is in position for operating the low speed gear 93 and when the shaft D is moved forwardly or to the left as viewed in Fig. 8, the low speed screw 70 will be rotated to cause the aforesaid braking operation of the low speed controlling device 32 to cause the low speed drive to take place through the transmission. It will furthermore be noted that with the low speed rack 100 in the position illustrated, the remaining racks 101, 102 as well as projection 103 are free from engagement with their respective associated gears 93$^a$, 93$^b$ and the lever 55. From Fig. 11 it will be noted that the shaft D has a space 104 longitudinally and circumferentially between the reverse rack 101 and the low speed rack 100, this space being designated as the neutral space so that when the shaft is positioned with this space facing the screw gears, each of the racks as well as projection 103 will be free from contact with their associated screw gears and lever 55 and the transmission will be in neutral at which time the various braking devices 32, 33, 34 and 35 are released.

In order to insure proper selective rotation of the shaft D prior to reciprocating action thereof, bushing 94 has a series of internal lugs 94$^a$ spaced to receive projections 94$^c$ to 94$^g$, inclusive, these projections being respectively longitudinally aligned with racks 100, 102, projection 103, rack 101, and neutral space 104. Only when the shaft D is properly adjusted to align the projections with the spaces between lugs 94$^a$ can the shaft D be reciprocated for its power stroke.

In order to selectively rotate the rack D for selectively engaging the racks and projection 103 thereof with the respective screw gears and lever 55, and also for axially operating the shaft in the various positions of selective adjustment, the following mechanism is provided.

Rearwardly adjacent the reverse rack 101, the shaft D is provided with a circular rack or gear 105 meshing with the segmental rack 106 rotatably fixed with a shaft 107 best shown in Fig. 11, this shaft being rotatably journaled by a bearing 108 carried by the transmission side cover 109. The shaft 107 has fixed thereto, outwardly of the transmission cover, a lever 110 connected at 111 (see Fig. 1) to a Bowden wire operating mechanism 112 which extends forwardly for pivotal connection with the ball end 113 of a lever assembly 114 secured to a tubular shaft 115 as shown in Figs. 5 to 7.

The forward end of the Bowden wire mechanism 112 has a guide 116 provided by the bracket 117 rigidly secured to the outer stationary tubular housing 118 comprising the steering post, as best shown in Fig. 1. A yielding connection is preferably provided at some convenient point between the manual selector element, which will be shortly described, and the sector 106 for rotatably adjusting the shaft D. We have illustrated this yielding connection in Fig. 7 intermediate the lever ball end 113 and the forward end of the Bowden wire mechanism 112. The wire 112 is anchored at its forward end to the housing 119 provided with the preloaded oppositely acting springs 120 and 121 which respectively act against the ball seats 122 and 123. The springs 120 and 121 have sufficient rigidity so that normally they provide a rigid connection between lever 114 and Bowden wire 112. However, if for any reason the manually operated adjusting mechanism for the shaft D should bind at any point, the mechanism will be protected during any manual adjustment of lever 114 under such conditions by reason of the ability of springs 120 and 121 to yield. This yielding connection is therefore in the nature of a safety device for the manually controlled selector operating mechanism. The hollow operating shaft 115 extends within the housing 118 and is rotatably journaled therein by reason of the upper and lower bearings 124 and 125 respectively.

Rotatable within the hollow shaft 115 is the hollow steering shaft 126 operably connected at its upper end to a steering wheel 127 and adapted for operable connection at its lower end to the usual steering mechanism for the front ground wheels of the motor vehicle (not shown). The hollow operating shaft 115 extends upwardly to the point preferably just below the steering wheel 127 to the manually controlled device generally designated at E for selectively controlling or manipulating the transmission speed ratios as will be presently more apparent.

Returning now to Fig. 8, the selector rack shaft D has its rear end adjacent the circular rack 105 provided with an annular groove 128 adapted to receive the flange 129 of the fluid pressure operating piston assembly 130 which reciprocates in the cylinder 131 which is a part of a casting 132 best illustrated in Fig. 13 as attached to the rear wall 99 of the transmission. The piston 130 provides the actuating member of the power operating means or pressure fluid operated motor G for moving shaft D under power to engage the various brake bands and the direct speed clutch 34.

For yieldingly urging the rack shaft D to the right or rearwardly to release the speed ratio controlling devices, we have provided prime mover means F preferably in the form of a compression coil spring surrounding the rear end portion of shaft D between the fixed abutment provided for the bearing member 97 and acting on piston 130. In Fig. 8 it will be noted that the bearing member 97 is conveniently held in position by clamping the same between the rear casing wall 99 of the transmission and the assembly 132.

The piston 130 has the flexible sealing cup 133 adapted to seal the piston against escape of the fluid forwardly of the cylinder 131, the cup 133 bearing against the walls of the cylinder under the action of the fluid pressure introduced to the pressure chamber 134. The sealing cup is held in place by the rearwardly extending threaded reduced end 135 of shaft D together with the fastener or nut 136. Fluid, such as oil under pressure, is introduced to the pressure chamber 134 as best shown in Fig. 13, through a passage 137 leading to the valve controlled chamber or cylinder 138 which slidably receives the fluid pressure supply controlling valve 139. The cylinder 138 is supplied with oil under pressure through a passage 140 which receives the oil by a conduit 141 formed in the transmission casing casting. The conduit 141, as best shown in Fig. 1, leads to the delivery side of a suitable pump 142 driven from its location in the oil storing sump or reservoir 143 of the transmission casing by reason of the shaft 144 provided at its forward end by a driving gear 145. This gear meshes with an idler gear 146 which in turn meshes with the driving pinion 147 (see Fig. 8) carried on the rear end of the driving sleeve 29 which, as aforesaid, is fixed to the fluid impeller 21.

A valve guide porting member 148 is pressed into the cylinder 138 so as to be fixed therewith, this porting member having annular conduits 149 and 150, respectively, communicating with the passages 140 and 137. The annular passages 149 and 150 are also respectively provided with the inwardly extending ports 151 and 152 adapted for control by the valve 139. This valve has a sliding fit within the cylindrical bore 153 of the porting member 148 and extending axially through the valve with sufficient clearance to prevent binding thereof, is a valve operating rod 154 preferably of brass or other non-magnetic material. The rod 154 extends forwardly of valve 139 and is provided with a stop 155 adapted to limit forward movement of valve 139 under the influence of a spring 156 which operates between the valve spring abutment 157 and a rear fixed abutment 158, the latter having associated therewith the fluid pressure sealing washers 159 acting against the threaded stem 160 of the electrical solenoid 161.

The rear end of valve operating rod 154 is connected at 162 with the armature 163 of solenoid 161, the armature being adapted for reciprocation in the solenoid cylinder 164 having the rear abutment 165. Any fluid which may leak rearwardly beyond the valve 139 is adapted to drain downwardly from the portion of casting 132 which encloses the valve operating spring 156 by reason of the drain conduit 166, this conduit then extending forwardly to the main body of the transmission where the oil is permitted to drain back to the reservoir 143. A further conduit 167 is adapted to return the oil from operating cylinder 134 back to the reservoir, this conduit 167 opening rearwardly to the forward end of valve 139.

The valve 139 has the reduced valving portion 168 adapted to place the conduits 140 and 137 in communication when the valve is in its forward position under the influence of spring 156. In the drawings, the parts are shown in their positions for operating the low speed controlling device 32, the valve 139 being positioned forwardly so that the fluid pressure is just being delivered from the supply conduit 140 to the conduit 137 and the pressure chamber 134 of the cylinder 131. When the valve 139 moves rearwardly under the influence of solenoid 161, as will be presently more apparent, the spring 156 will be compressed and the reduced portion 168 of the valve will no longer provide communication between conduits 140 and 137. At such time the conduit 137 will be open through the port 152 to the discharge conduit 167 for returning the oil from the pressure chamber 134 back to the reservoir 143. When the valve 139 moves forwardly under the influence of spring 156, the reduced valve portion 168 affords communication between conduits 140 and 137 to supply fluid pressure from the pump 142 to operate the piston 130 and selector rack shaft D forwardly for actuating one of the speed ratio controlling devices 32, 33, 34 or 35, depending on the rotative selective adjustment of the selector rack shaft, as will be present more apparent.

The function and operation of the manually controlled selector mechanism E in relation to the selector rack shaft D will now be further described.

Secured to the upper end of the hollow operating shaft 115, as best seen in Fig. 4 is an annular collar 169 having an integral laterally extending projection 170 providing an abutment for a spring 171 which has its lower end yieldingly acting against an intermediate portion of the manually operated selector element or lever 172. It will be noted that the extension 170 projects through an arcuate opening 173 of the fixed housing 118 to accommodate oscillatory adjustment of the extension 170.

The inner end of selector lever 172 is pivotally mounted at 174 to an intermediate portion of the collar extension 170 so that the selector lever may have vertical movement on pivots 174 relative to the extension 170 but when lever 172 is moved around the axis of the steering post housing 118, the collar 169 together with its extension 170 and the shaft 115 will be rotatively moved as a unit.

Fixed on the upper end of the housing 118 is the housing 175 preferably in the shape of a sector. The outer end of this housing has a downwardly extending flange 176 provided with an arcuate opening 177 through which the lever 172 extends for arcuate adjustment. The outer end of the selector lever is provided with a knob or handle 178 adapted for convenient grasp by the hand of the motor vehicle driver.

The outer curving edge of housing 175 is preferably formed with a number of legends characterizing the various positions of manual adjustment of selector lever 172 depending on the number of stations of adjustment for this lever. In the particular embodiment illustrated, the selector lever 172 is adapted to have five positions of adjustment, 179, 180, 181, 182 and 183 bearing the legends indicated in Fig. 3 designating the lever positions corresponding to first, second, third, neutral and reverse conditions of control for the transmission.

The flange 176 of housing 175 carries an arcuately arranged switch mechanism below the selector lever 172, this mechanism being best illustrated in the wiring diagram of Fig. 16. This switch comprises an arcuate floor 184 provided with a series of grooves or notches 185, 186, 187, 188 and 189 corresponding respectively to the positions of selector lever 172 when adjusted to the stations 179 to 183, inclusive. The upper sides of the aforesaid notches are preferably chamfered or beveled, as shown in Fig. 16, and the portion of selector lever 172 engageable with these notches is likewise beveled as indicated at 190. I will be observed that the floor of the switch member 184 is relatively elevated at 191 adjacent the neutral notch 188 in the direction of the reverse notch 189, the elevated floor 191 and the selector lever 172 having companion shouldered portions 192 adapted for engagement when the lever is moved in the direction of the reverse notch 189.

When the operator desires to select any condition of control of the transmission, he swings the selector lever 172 into the desired position, the spring 171 yieldingly urging the selector lever downwardly into engagement with one of the notches of the switch member 184. By reason of the beveled faces of the notches and selector lever, the desired adjustment of the selector lever may be quickly accomplished by simply applying a pressure on the selector lever in the direction of its swing and if the desired station is not immediately adjacent the station from which an adjustment is to be made, the selector lever will jump over any intervening notch of the switch member 184 without requiring the transmission to be manipulated for the condition of such intervening station or stations. However, before one is thoroughly skilled in the manipulation of the selector lever 172 it will be more customary for the operator to grasp the handle 178 and slightly lift the selector lever against the compression of spring 171 and out of one of the notches of the switch member 184. This movement will be followed or compounded with an annular swinging movement of the selector lever 172 into whichever notch is desired at which time the operator will release the handle 178 and the selector lever will drop into the notch selected, the selector lever being guided into the notch by reason of the beveled spaces of the notches and selector lever.

The engaging step portions 192 act as a safety to prevent an accidental shifting of the selector lever into the reverse notch 189 and also provide a convenient means of rapidly shifting the selector lever into the neutral notch 188 without even glancing at the neutral mark on the housing 175. Thus, for example, should the operator be driving in the third speed condition with the selector lever 172 located in the third speed switch notch 187, he can immediately adjust the selector lever into the neutral notch without danger of moving the lever into the reverse notch 189 by simply thrusting against the selector lever which will jump the intervening notches 186 and 185 and register at the neutral notch 188 for releasing all drives through the transmission. While we have arranged the selector lever for swinging movement in the direction of the plane of the steering wheel 127, the housing 175 could obviously be arranged for other movements of swing of the selector lever and further, if desired, the housing 175 could be inverted so that the lever could be moved downwardly out of the switch notches instead of upwardly as illustrated. Various other alternative arrangements will readily suggest themselves from our disclosure.

Returning now to Fig. 4, it will be noted that we have provided an electric light bulb 193 mounted on the housing 175 and provided with a casing 194 having a slot 195 adapted to direct the light rays in concentrated fashion toward the outer marginal edge of the housing 175 so that when the light bulb 193 is lighted, the indicia 179 to 183 will be illuminated and easily read at a glance by the motor vehicle driver. Such arrangement is particularly of advantage during the conditions of night driving and we have provided a novel arrangement whereby the light bulb 193 will be illuminated only during such time as the operator is making an adjustment of the selector lever 192. Such arrangement is desirable inasmuch as the light bulb will not interfere with the vision of the driver and will only be illuminated when it is desired to read the markings for indicating the positions of control of the selector lever.

Referring now the wiring diagram illustrated in Fig. 16, we have provided a plurality of switches or contacts 196 for each of the notches of the switch member 184, each individual switch 196 being adapted for operation by a stem 197 slidable in an opening 198 communicating with each of the switch notches so that when the selector arm is located in any of the switch notches, one of the stems 197 associated with such notch is engaged by the selector lever and is pushed downwardly by the spring 171 to break the current through the wire 199 which connects all of the switches 196 in series. Each switch 196 has a spring 200 associated therewith for restoring the switch to its contacting position and raising its stem 197 as soon as the selector lever is moved out of one of the notches. The wire 199 connects with one terminal of a storage battery 201, the other terminal of the battery being grounded through a lead 202.

The light bulb 193 has one terminal grounded at 194, the other terminal being connected through a wire 195 to the aforesaid series switch wire 199. This wire 199 extends to the usual ignition switch 206 controlled by a key 207 for electrically connecting the wire 199 with its extension wire 208, the latter having a solenoid winding 209 terminating in a ground 210.

The solenoid 209 provides a relay generally designated at 211 whereby an initial relatively small current may be initiated by any of the switches 196 thereby minimizing sparking at these switches, the relay 211 being adapted to control a secondary circuit of relatively higher amperage for energizing the solenoid 161 through its primary coils 212.

Thus, the higher conductor wires 213 and 214 respectively lead to battery 201 and primary solenoid coils 212, the terminal contacts 215 and 216 being electrically bridged by a switch piece 217 having companion contacts 218 and 219. The switch piece 217 is carried by an armature 220 yieldingly urged by a spring 221 to normally break the circuit through wires 213 and 214. The primary windings 212 of solenoid 161 may be directly grounded although in our illustration these windings are illustrated as being grounded at 222 through the intermediary of a further relay switch 223 normally urged to establish the grounding circuit by a spring 224. The switch 223 is adapted for movement to its open position by reason of its actuating stem 225 projecting forwardly through the aforesaid armature abutment 165 so that during the final rearward movement of the armature 163 the latter will engage the stem 225 and open the switch 223.

The solenoid 161 may also be provided with a secondary winding 226 carrying a relatively small amperage and grounded at 227, such arrangement of primary and secondary windings providing a relatively heavy initial pull on the armature 163 for insuring a rapid movement of the fluid pressure control valve 139 to its rearward position, followed by the smaller amount of current through the secondary winding 226 by simply holding the armature in the rearward position against the action of spring 156. Furthermore, such secondary winding has the advantage that in the event that the motor vehicle operator should leave the selector lever 172 in a position intermediate the notches of switch member 184, the solenoid windings will not be burned out or damaged inasmuch as the current through the solenoid 161 only momentarily passes at high amperage through the primary winding 212 followed by the relatively low amperage through the secondary windings 226.

Our manually controlled selector operating mechanism is practically instantaneous in its response to selective adjustment of the lever 172 and the different selections may be made as rapidly as desired. In the general operation of the selector mechanism E for changing the transmission speed ratio, the operator moves the selector lever 172 from one of the station notches in the switch member 184. Just as soon as the selector lever is moved from one of the notches, the switch 196 associated with such notch will be closed thereby inducing an electrical circuit through the relay 211 which in turn induces a circuit of relatively high amperage through the primary solenoid windings 212 for causing the solenoid armature 163 to move rearwardly. This rearward movement of the solenoid armature will adjust the valve 139 rearwardly to place the fluid pressure chamber 134 of cylinder 131 in communication with the reservoir discharge conduit 167 whereupon the spring F will move the shaft D rearwardly to release any of the controlling devices 32 to 35 which may have been in operation. This entire phase of the operation takes place very quickly during the initial part of adjustment of the selector lever out of one of the notches of the switch member 184.

The rearward movement of the solenoid armature 163 engages the stem 225 causing the switch 223 to open and thereby cut out the primary solenoid 212, the secondary windings 226 then holding the solenoid 163 in its rearward position. The selector lever 172 may then be moved into any other station of control and dropped into the corresponding notch for such position.

When the selector lever is so released it will be apparent that one of the switches 196 corresponding to such newly selected position will be opened thereby interrupting the electrical circuit through the wire 199 which causes the relay 211 to be deenergized for breaking the circuit through the solenoid windings 226. At such time the spring 156 will immediately act to move the valve 139 and armature 163 forwardly to establish communication between the fluid pressure supply conduit 140 and the pressure chamber 134. This will immediately cause a forward movement induced by the fluid pressure on the shaft D for operating one of the selector controlling devices which may have been selected for the new position or else for operating shaft D without causing any movement of any of the speed ratio controlling devices in the event that neutral was selected.

Returning now to the aforesaid cycle of operation and to the point where the selector lever 172 was described as having been moved out of one of the notches preparatory to movement thereof into a newly selected notch, just as soon as the solenoid armature 163 moves rearwardly to operate valve 139 to vent the pressure chamber 134, it will be apparent that the fluid pressure load is removed from the shaft D which is now in its rearward position so that arcuate movement of the selector lever 172 will operate through the hollow steering post shaft 115, Bowden wire mechanism 112 and sector 106 to rotatably adjust the shaft D into a new position for actuation of one of the speed ratio controlling devices. The mechanism operates almost instantaneously so that there is practically no resistance to immediate arcuate adjustment of selector lever 172 from a position in one of the notches although any binding tendency experienced at the shaft D during the initial or other tendency to move the shaft will be taken up yieldingly through the Bowden wire connection shown in Fig. 7.

When it is desired to shift to reverse, the operator must lift the selector lever 172 to a relatively great extent in order to swing the lever to a reverse notch 189 and this additional effort required by the operator acts as a safety measure to prevent accidental shifting of the selector lever to the reverse position.

It will be noted that the light bulb 193 is included in the series circuit of switches 196 so that whenever the selector lever 172 is positioned at one of its stations of control, one of the switches 196 is open thereby cutting out the bulb 193. However, just as soon as the selector lever is grasped for operation the circuit is completed through the switches 196 and the light bulb 193 will be illuminated so that the motor vehicle driver may conveniently and instantly read the markings for the stations on the housing 175.

One feature of our invention resides in the simplified motor vehicle control which is possible by our novel transmission system, one preferred embodiment of this control being illustrated in Fig. 2 wherein it will be observed that the selector lever 172 is positioned for manipulation laterally to the right of the steering wheel 127 and just therebelow so that the hand of the operator on the steering wheel may be quickly and conveniently moved to the handle 178 for effecting a change in the condition of the transmission. Our transmission provides for convenient manipulation of the motor vehicle by providing the engine throttle control or accelerator pedal 228 on the toe board 229 preferably at the right hand side of the steering post 118 so that it may be manipulated by the right foot of the driver. On the other side of the steering post we have located a relatively wide pedal 230 which is adapted for operating the wheel brakes of the motor vehicle. Such arrangement of control provides a very convenient positioning of the feet of the driver as well as for his hands, it being apparent that with the use of the fluid clutch B there is no necessity for a clutch pedal. In driving the vehicle, the car may be brought to rest by releasing the accelerator pedal 228 and depressing the brake pedal 230 and it is not even necessary to move the selector lever 172 into the neutral notch 188 unless so desired. In order for a rapid acceleration of the motor vehicle after making a stop, the operator may move the selector lever into the low speed notch 185 in making a stop so that just as soon as acceleration is desired, it is only necessary to depress the accelerator pedal 228. Furthermore, the accelerator pedal may, if desired, be held in its depressed condition while shifting the selector lever 172 between stations of forward drive inasmuch as the fluid coupling B will absorb the shock during such speed changes by reason of its inherent slipping qualities.

Figure 19:
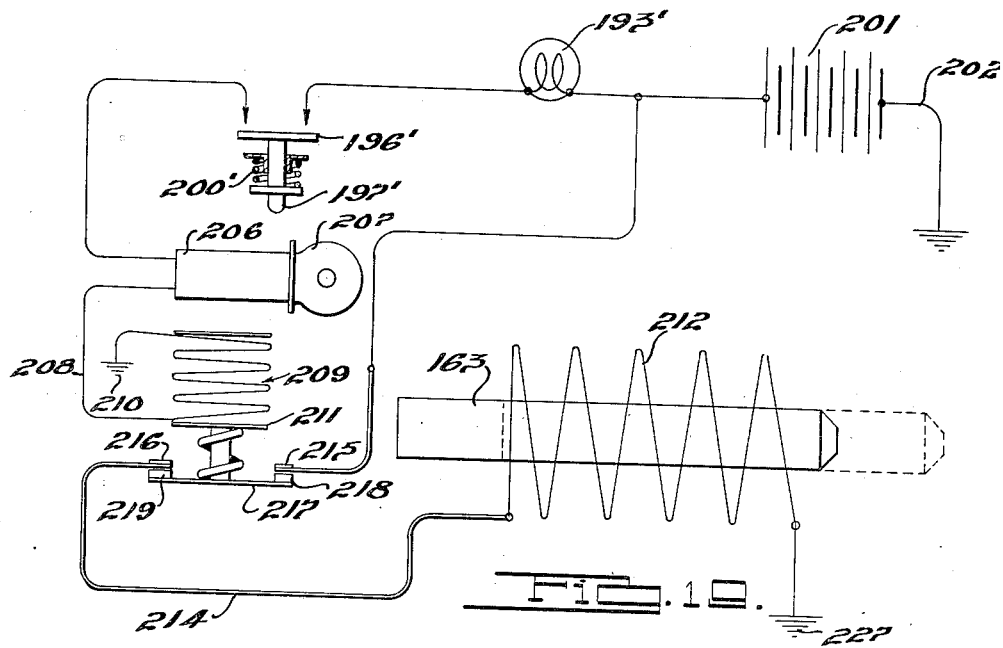
Fig. 19 is a diagrammatic view of the electrical wiring circuit for the Fig. 17 modification.

Referring now to the modified embodiment illustrated in Figs. 17 to 19, we have provided an arrangement incorporating a single contact switch which is adapted for operation at any position of the selector arm 172'. It will be understood that this modified arrangement is intended to be substituted for the corresponding parts previously described and the entire mechanism and the operation of the same will not again be duplicated.

The same steering column parts as before described are illustrated in Figs. 17 and 18 with the following changes. The column 169' has a relatively shorter extension 170' to which is pivotally connected at 174' the selector lever 172' formed with a return bent portion 231 extending around the depending flange 176' of the housing 175'. In this instance the light bulb 193' is incorporated as a unit with the single switch 196', the latter having an actuating stem 197' always in contact with a curved swinging actuator 232 pivotally mounted at 233 with the housing 175'. The station positions of selector lever 172' are determined by notches 185' to 189' respectively corresponding to the aforesaid notches 185 to 189 inclusive, these notches being formed in a stationary arcuate transverse floor bar 234. With the selector lever engaged in one of the notches, as illustrated in Fig. 18, the switch 196' is open and the swinging actuator 232 fills the space between the selector lever and the switch stem 197' so that just as soon as the selector lever is moved from any notch, the switch 196' is closed against the action of a return spring 200' to light the bulb 193' to induce a current flow through the relay coil 209 and thereby close the switch member 217 of the relay 211 for actuation of the solenoid armature 163.

It will be noted that in Fig. 19 the solenoid 163 is provided with only one set of windings 212 and that the electrical circuit is otherwise largely corresponding to that illustrated in Fig. 16 and as indicated by the use of similar reference characters. In Fig. 19 the secondary solenoid coil has been omitted and likewise the armature control switch of Fig. 16. If desired the relay 209 may be dispensed with and the full current necessary to operate solenoid 163 may be passed directly through the single switch 196', it being preferable under such conditions to employ silver or other alloy switch points to minimize sparking.

As a further feature of our invention we have provided an auxiliary means for manually operating one of the speed ratio controlling devices, such control being ordinarily useful in the event of failure of the main operating system. Such arrangement is preferably adapted to operate the direct or third speed controlling device 34 and in the present embodiment of our invention the following relatively simple mechanism is provided.

Referring particularly to Figs. 1, 8, 9 and 10, the third speed actuating lever 55 has its aforesaid end 55ª positioned for operation by the manually operated auxiliary controlling mechanism independently of the operation of the lever portion 59 under power from shaft D and projection 103 thereof. Thus, the side of the transmission casing adjacent the lever end 55ª is provided with an opening 235 closed by a cover member 236 rotatably journalling a shaft 237. Within the cover this shaft has fixed therewith an operating lever 238 adapted to engage lever end 55ª for imparting to the lever 55 a swinging movement about its pivot 56 in the same direction as that imparted to the lever by the rack D for actuating the direct speed controlling device 34. To this end, the shaft 237 has an outer portion thereof extending beyond the cover 236, this shaft portion being provided with with the flaps 239 adapted for engagement with the wrench-like end 240 of a manual shift lever 241. This lever 241 may be conveniently stored with the tools carried by the motor vehicle since normally it does not form a part of the transmission operating mechanism. However, when it is desired to manually operate the third speed controlling device 34 independently of the power system, the lever 241 may be conveniently inserted through a suitable slot in the floor board or toe board 229 of the vehicle with the wrench engaging end 240 fitting the flaps 239 of shaft 237. In such position the operator moves the lever 241 forwardly with either his hand or his foot thereby causing actuation of the direct speed controlling device 34 for effecting an auxiliary drive for the motor vehicle through the transmission.

Various modifications and changes will be apparent from the teachings of our invention, as defined in the appended claims, and it is not our intention to limit our invention to the particular details of construction and mode of operation shown and described for illustrative purposes.

We claim:

1. In a motor vehicle transmission having a plurality of speed ratio controlling devices, fluid power operating means for selectively operating said controlling devices, an adjustable element adapted to selectively establish an operating connection between said power operating means and said controlling devices, fluid pressure valving means controlling said power operating means, electrically energized means for operating said valving means, a manually operable selector element, motion transmitting mechanism operably connecting said selector element with said adjustable element, and means so constructed and arranged that manual adjustment of said selector element causes operation of said electrically energized means and adjustment of said adjustable element through the medium of said motion transmitting mechanism.

2. In a motor vehicle transmission having a plurality of speed ratio controlling braking devices, fluid power operating means for selectively applying said braking devices, an adjustable element adapted to selectively establish an operating connection between and to transmit braking force between said power operating means and said braking devices, fluid pressure valving means controlling said power operating means, electrically energized means for operating said valving means, means for adjusting said element, a manually operable selector element adapted for manual adjustment to a plurality of stations of transmission control, means for inducing operation of said electrically energized means in response to movement of said selector element at each of said stations, and means for operating said element adjusting means in response to movement of said selector element from one of said stations to another.

3. In a motor vehicle transmission having a plurality of speed ratio controlling devices, fluid power operating means for selectively operating said controlling devices, an adjustable element adapted to selectively establish an operating connection between said power operating means and said controlling devices, fluid pressure valving means controlling said power operating means, electrically energized means for operating said valving means, a manually operable selector element adapted for manual adjustment to a plurality of predetermined stations of transmission control, means associated with each of said stations for inducing a control on said electrically energized means when said selector element is positioned at any of said stations, and motion transmitting mechanism operably connecting said selector element with said adjustable element for operating said element adjusting means in response to adjustment of said selector element.

4. In a power transmission, a plurality of speed ratio controlling braking devices, means including a power operator for selectively applying said braking devices, means including a solenoid for controlling operation of said power operator means, an adjustable selector element adapted for movement to a plurality of predetermined stations of transmission control, and electrical switch controlled means for inducing operation of said solenoid in response to movement of said element at each of said stations.

5. In a power transmission, a plurality of speed ratio controlling braking devices, means including a power operator for selectively applying said braking devices, means including a solenoid for controlling operation of said power operator means, an adjustable selector element adapted for movement to a plurality of predetermined stations of transmission control, and electrical means including a plurality of switches respectively associated with said stations for inducing operation of said solenoid in response to movement of said element at each of said stations.

6. In a power transmission, a plurality of speed ratio controlling devices, means including a power operator for selectively operating said devices, means including a solenoid for controlling operation of said power operator means, a single operator-moved selector element adapted for movement to a plurality of predetermined stations of transmission control for producing speed ratio changes in response to movement thereof between said stations, and electrical means including a single switch associated with said stations, said electrical means further including an electrical circuit between said switch and solenoid for inducing operation of said solenoid, said electrical circuit being energized in response to movement of said element between each of said stations.

7. In a power transmission, a plurality of speed ratio controlling braking devices, means including a power operator for selectively applying said braking devices, means including a solenoid for controlling operation of said power operator means, an adjustable selector element adapted for movement to a plurality of predetermined stations of transmission control, electric circuit means for energizing said solenoid, electrical switch means controlling said electric circuit means, and means responsive to movement of said element at each of said stations for operating said switch means.

8. In a power transmission, a plurality of speed ratio controlling devices, means including a power operator for selectively operating said devices, means including a solenoid for controlling operation of said power operator means, an adjustable selector element adapted for movement to a plurality of predetermined stations of transmission control, electrical switch controlled means for inducing operation of said solenoid in response to movement of said element at each of said stations, and means responsive to movement of said selector element between said stations for selectively operably connecting said power operator means with said controlling devices.

9. In a power transmission, a plurality of speed ratio controlling devices, means including a power operator for selectively operating said devices, means including a solenoid for controlling operation of said power operator means, an adjustable selector element adapted for movement to a plurality of predetermined stations of transmission control, primary and secondary electrical circuits, switch means operable by energizing said primary circuit for closing said secondary circuit, said secondary circuit including said solenoid, additional switch means controlling said primary circuit, and means responsive to movement of said element at each of said stations for operating said additional switch means.

10. In a power transmission, a plurality of speed ratio controlling devices, means including a power operator for selectively operating said devices, means including a solenoid for controlling operation of said power operator means, an adjustable selector element adapted for movement to a plurality of predetermined stations of transmission control, a member bearing station indicia for indicating the station positioning of said element, an illuminator for said station indicia, electrical circuit means for energizing said solenoid and illuminator, and switch means for activating said circuit means in response to movement of said element between each of said stations, said illuminator being deenergized when said element is positioned selectively at said stations during normal transmission driving conditions.

11. In a power transmission, a plurality of speed ratio controlling devices, means including a power operator for selectively operating said devices, means including a solenoid for controlling operation of said power operator means, an adjustable selector element adapted for movement to a plurality of predetermined stations of transmission control, a member bearing station indicia for indicating the station positioning of said element, an illuminator for said station indicia, electrical circuit means for energizing said solenoid and illuminator, switch means for activating said circuit means in response to movement of said element at each of said stations, and means responsive to movement of said selector element between said stations for selectively operably connecting said power operator means with said controlling devices.

12. In a power transmission having a plurality of speed ratio controlling devices, an adjustable selector element adapted for movement between a plurality of stations to control selective operation of said devices, means for mounting said element for multiple directional movement between said stations, power operating means for selectively operating said devices, selector operating means providing selective operative connection between said power operating means and said devices, electrically energized means for effecting operation of one of said operating means in response to movement of said element in one of said multiple-directional movements, and means for exercising a control on the operation of the other of said operating means in response to movement of said element in another of said multiple directional movements.

13. In a power transmission having a plurality of speed ratio controlling devices, an adjustable selector element adapted for movement between a plurality of stations to control selective operation of said devices, means for mounting said element for swinging movement about an axis of support and for further movement transversely to said swinging movement in adjusting said element between said stations, power operating means for selectively operating said devices, selector operating means providing selective operative connection between said power operating means and said devices, electrically energized means for effecting operation of said power operating means in response to said transverse movement of said element, and means for effecting selective control on the operation of said selector operating means in response to said swinging movement of said element.

14. In a power transmission, a plurality of speed ratio controlling devices, means including a power operator for selectively operating said devices, means including a solenoid for controlling operation of said power operator means, an adjustable selector operating member adapted for actuation by said power operator means to selectively operate said devices, an adjustable selector element adapted for movement to a plurality of predetermined stations of transmission control, electrical means for inducing operation of said solenoid and including switch means therefor actuated in response to movement of said element, and means operated in response to movement of said element for adjusting said selector operating member to provide selective operative connection thereof with said devices.

15. In a motor vehicle transmission of the planetary gear type having a plurality of planetary gear operated rotary controlling elements, means respectively associated with said rotary elements and adapted for operative engagement therewith to control the drive through the transmission, fluid power operating means for selectively operating said element engaging means, an adjustable member adapted to selectively establish an operating connection between said power operating means and said element engaging means, fluid pressure valving means controlling said power operating means, electrically energized means for operating said valving means, means for adjusting said adjustable member, and means including a manually operable selector element so constructed and arranged that manual adjustment of said selector element causes operation of said electrically energized means and said member adjusting means.

16. In a motor vehicle transmission of the planetary gear type having a plurality of planetary gear operated rotary controlling elements, means respectively associated with said rotary elements and adapted for operative engagement therewith to control the drive through the transmission, means including a power operator for selectively operating said element engaging means, means including a solenoid for controlling operation of said power operator means, an adjustable selector element adapted for movement to a plurality of predetermined stations of transmission control, and electrical switch controlled means for inducing operation of said solenoid in response to movement to said selector element at each of said stations.

17. In a motor vehicle transmission of the planetary gear type having a plurality of planetary gear operated rotary controlling elements, means respectively associated with said rotary elements and adapted for operative engagement therewith to control the drive through the transmission, means including a power operator for selectively operating said element engaging means, means including a solenoid for controlling operation of said power operator means, an adjustable selector element adapted for movement to a plurality of predetermined stations of transmission control, electrical switch controlled means for inducing operation of said solenoid in response to movement of said selector element at each of said stations, and means responsive to movement of said selector element between said stations for selectively operably connecting said power operator means with said element engaging means.

18. In a planetary gear transmission having a plurality of braking devices and a clutch operably associated with the planetary gearing for selectively controlling the drive therethrough, means associated with each of said braking devices for effecting their actuation, means associated with said clutch for effecting its actuation, a selector operating member having an intermediate portion thereof adapted for selective operative connection with said actuating means for said braking devices, said selective operating member having an end portion thereof adapted for engagement with said actuating means for said clutch, and means for selectively operating said member.

19. In a planetary gear transmission having a plurality of braking devices and a clutch operably associated with the planetary gearing for selectively controlling the drive therethrough, means associated with each of said braking devices for effecting their actuation, means associated with said clutch for effecting its actuation, a selector operating rack shaft having a plurality of toothed racks carried by an intermediate portion of said rack shaft and adapted for selective operative connection with said actuating means for said braking devices, said rack shaft having an end portion thereof adapted for engagement with said actuating means for said clutch, and means for selectively operating said rack shaft.

20. In a transmission having a plurality of speed ratio controlling devices, means for selectively operating said devices, a fluid pressure actuated device operably connected to said selective operating means, a valve controlling fluid pressure delivery to said fluid pressure device, a solenoid actuator operably connected to said valve, an adjustable selector element adapted for movement to a plurality of predetermined stations of control, motion transmitting mechanism operably connecting said selector element with said selectively operating means, and means responsive to movement of said selector element at each of said stations for energizing said solenoid.

21. In a transmission having a plurality of speed ratio controlling devices, means for selectively operating said devices, a fluid pressure actuated device operably connected to said selective operating means, a valve controlling fluid pressure delivery to said fluid pressure device, a solenoid actuator operably connected to said valve, an adjustable selector element adapted for movement to a plurality of predetermined stations of control, means responsive to movement of said selector element at each of said stations for energizing said solenoid, and means responsive to movement of said selector element between said stations for controlling the selective operation of said devices by said selective operating means.

22. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, an adjustable rack shaft adapted for selective operative connection with said actuating means, manually operated means for selectively adjusting said rack shaft, fluid pressure operating means for actuating said rack shaft, solenoid valve means controlling a supply of fluid under pressure to said fluid pressure operating means, and means responsive to operation of said manually operated means for controlling said solenoid valve means.

23. In a motor vehicle transmission having a plurality of speed ratio controlling devices, means operably associated with each of said controlling devices for actuating said devices, an adjustable operating element adapted for selective operative connection with said actuating means for said controlling devices, manually controlled means for selectively adjusting said operating element, a cylinder, a piston operating in said cylinder, means operably connecting said piston and said operating element, valve means for admitting a fluid under pressure to said cylinder for causing said piston to actuate said operating element in one direction of movement thereof, means including a solenoid for actuating said valve means, and spring means for restoring said piston to thereby actuate said operating element in a direction substantially opposite to that aforesaid.

24. In a planetary transmission having a plurality of planetary gear sets and associated rotary controlling elements, a plurality of brake devices respectively operably associated with certain of said rotary elements, a clutch operably associated with one of said rotary elements, a lever for operating said clutch, power operating means for selectively operating said brake devices and clutch, and a manually operable shift member removably attachable to said lever actuating means for operating said clutch independently of said power operating means.

25. In a transmission, a plurality of speed ratio controlling devices, power operating means for selectively actuating said devices, selector operating means adapted to selectively provide an operating connection between said power operating means and said devices, a selector element movable to a plurality of predetermined stations of transmission control, means responsive to movement of said selector element from one of said stations to another for controlling said power operating means, and a yieldable operating connection between said selector element and said selector operating means.

26. In a motor vehicle transmission of the planetary gear type having a plurality of planetary gear operated rotary controlling elements, means respectively associated with said rotary elements and adapted for operative engagement therewith to control the drive through the transmission, power operating means for selectively actuating each of said engaging means, means selectively operably connecting said power operating means wih each of said engaging means, a manually operable selector member movable to a plurality of positions of transmission control, electrically energized means operable in response to manual operation of said selector member for controlling the operation of said power operating means, and means acting in response to manual operation of said selector member for selectively controlling said operable connection between said power operating means and each of said engaging means, the last said controlling means including an actuating element operably connected to said selector member and adapted to transmit movement therefrom to said selectively operable connection means.

27. In a motor vehicle transmission of the planetary gear type having a plurality of planetary gear operated rotary controlling elements, means respectively associated with said rotary elements and adapted for operative engagement therewith to control the drive through the transmission, power operating means for selectively actuating each of said engaging means, means selectively operably connecting said power operating means with each of said engaging means, a manually operable selector member movable to a plurality of positions of transmission control, electrically energized means operable in response to manual operation of said selector member for controlling the operation of said power operating means, and means acting in response to manual operation of said selector member for selectively controlling said operable connections between said power operating means and each of said engaging means, the last said controlling means including a flexible cable operably connected to said selector member and adapted to transmit movement therefrom to said selectively operable connecting means.

28. In a motor vehicle transmission of the planetary gear type having a plurality of planetary gear operated rotary controlling elements, means respectively associated with said rotary elements and adapted for operative engagement therewith to control the drive through the transmission, power operating means for selectively actuating each of said engaging means, means selectively operably connecting said power operating means with each of said engaging means, a manually operable selector member movable to a plurality of positions of transmission control, and a plurality of means acting in response to manual operation of said selector member respectively for controlling the operation of said power operating means and for selectively controlling said operable connections between said power operating means and each of said engaging means, one of said plurality of means including electric switch means actuated in response to movement of said selector member, the other of said plurality of means including a movement transmitting element operably connected to said selector member.

29. In a motor vehicle transmission of the planetary gear type having a plurality of planetary gear operated rotary controlling elements, means respectively associated with said rotary elements and adapted for operative engagement therewith to control the drive through the transmission, means including a power operator for selectively operating said element engaging means, means including a solenoid for controlling operation of said power operator, an adjustable selector element adapted for movement to a plurality of predetermined stations of transmission control, and electrical switch controlled means for inducing operation of said solenoid in response to movement of said selector element from one of said stations to another, said electrical switch controlled means including a movable switch operating member actuated by said selector element.

30. In a motor vehicle transmission of the planetary gear type having a plurality of planetary gear operated rotary controlling elements, means respectively associated with said rotary elements and adapted for operative engagement therewith to control the drive through the transmission, means including a power operator for selectively operating said element engaging means, means including a solenoid for controlling operation of said power operator, an adjustable selector element adapted for movement to a plurality of predetermined stations of transmission control, electrical switch controlled means for inducing operation of said solenoid in response to movement of said selector element from one of said stations to another, said electrical switch controlled means including a movable switch operating member actuated by said selector element, and means responsive to movement of said selector element from one of said stations to another for selectively operably connecting said power operating means with said element engaging means.

31. In a motor vehicle transmission of the planetary gear type having a plurality of planetary gear operated rotary controlling elements, means respectively associated with said rotary elements and adapted for operative engagement therewith to control the drive through the transmission, fluid pressure operating means for selectively actuating each of said engaging means, means selectively operably connecting said fluid pressure operating means with each of said engaging means, valving means for controlling communication between a fluid pressure supply and said fluid pressure operating means, solenoid means operably connected to said valving means and adapted when energized to operate said valving means to close said communication between said fluid pressure supply and said fluid pressure operating means, a manually operable selector member movable to a plurality of positions of transmission control, electrical switch controlled means for controlling operation of said solenoid means in response to movement of said selector member between its said positions of transmission control, said electrical switch controlled means acting to de-energize said solenoid means when said selector member is in said positions of transmission control, and means for actuating said valving means to establish communication between said fluid pressure supply and said fluid pressure operating means in response to said de-energization of said solenoid means.

32. In a motor vehicle transmission of the planetary gear type having a plurality of planetary gear operated rotary controlling elements, means respectively associated with said rotary elements and adapted for operative engagement therewith to control the drive through the transmission, fluid pressure operating means for selectively actuating each of said engaging means, means selectively operably connecting said fluid pressure operating means with each of said engaging means, valving means for controlling communication between a fluid pressure supply and said fluid pressure operating means, solenoid means operably connected to said valving means, and adapted when energized to operate said valving means to close said communication between said fluid pressure supply and said fluid pressure operating means, a manually operable selector member movable to a plurality of positions of transmission control, electrical switch controlled means for controlling operation of said solenoid means in response to movement of said selector member between its said positions of transmission control, said electrical switch controlled means acting to de-energize said solenoid means when said selector member is in said positions of transmission control, means for actuating said valving means to establish communication between said fluid pressure supply and said fluid pressure operating means in response to said de-energization of said solenoid means, and means acting in response to manual operation of said selector member for selectively controlling said operable connections between said fluid pressure operating means and each of said engaging means.

33. In a motor vehicle transmission, a plurality of speed ratio controlling elements, fluid pressure operated means for selectively actuating said elements, valving means controlling communication between a source of fluid pressure and said fluid pressure operated means, a solenoid for operating said valving means, electric circuit means for said solenoid including switch controlling means therefor, a selector element manually adjustable to positions of transmission control, said selector element actuating said switch means to break said electric circuit means in response to adjustment of said selector element to said positions of control, and means actuating said valving means to establish communication between said fluid pressure supply and said fluid pressure operated means in response to said breaking of said circuit.

34. In a motor vehicle transmission having a plurality of speed ratio controlling devices, electrically controlled power operating means, selector mechanism operable to establish selective operating connections between said power operating means and said devices, an operator-controlled element shiftable to a plurality of stations of transmission control, electric means de-energized when said element is positioned at each of said stations and energized in response to movement of said element in leaving each of said stations during shift thereof toward another of said stations for controlling said power operating means, and means operably connecting said selector mechanism with said element for transmitting shift movements of said element to said selector mechanism to provide said selective operative connections under control of said element.

35. In a motor vehicle transmission having a plurality of speed ratio controlling devices, electrically controlled power operating means, selector mechanism operable to establish selective operating connections between said power operating means and said devices, an operator-controlled element shiftable to a plurality of stations of transmission control, electric means de-energized when said element is positioned at each of said stations and energized in response to movement of said element in leaving each of said stations during shift thereof toward another of said stations for controlling said power operating means, and lost-motion operating means connecting said selector mechanism with said element for transmitting shift movements of said element to said selector mechanism to provide said selective operative connections under control of said element, said lost-motion means accommodating said movement of said element in leaving each of said stations prior to transmitting said shift movements of said element to said selector mechanism.

36. In a motor vehicle transmission of the planetary gear type having a plurality of engageable rotary control elements, a plurality of means respectively engageable with said rotary elements to control the transmission drives, an operator-controlled element shiftable to a plurality of stations of transmission control, a power device, means electrically energized in response to shift of said shiftable element for controlling operation of said power device, means selectively adjustable to provide selective operation of said plurality of engageable means by said power device, and means operably connecting said selectively adjustable means with said shiftable element for effecting selective adjustment thereof in response to shift of said shiftable element.

37. In a motor vehicle transmission of the planetary gear type having a plurality of engageable rotary control elements, a plurality of means respectively engageable with said rotary elements to control the transmission drives, an operator-controlled element shiftable to a plurality of stations of transmission control, an electrical switch having a movable contact member, an operator for said contact member supported for movement by said shiftable element in shifting said element between each of said stations and so arranged that said switch closes during shifting of said shiftable element and opens when said shiftable element is positioned at each of said stations during normal vehicle drive conditions, a fluid pressure operated motor, a valve controlling delivery of fluid under pressure to said motor, means acting to maintain said valve in position to deliver said fluid to said motor when said shiftable element is positioned at each of said stations as aforesaid, a solenoid operably connected to said valve and adapted when energized to position said valve to prevent said fluid delivery to said motor, electrical circuit means between said switch and solenoid, and means operable in response to shifting of said shiftable element to selectively establish operable connection between said motor and said plurality of element-engageable means.

38. In a motor vehicle transmission of the planetary gear type having a plurality of engageable rotary control elements, a plurality of means respectively engageable with said rotary elements to control the transmission drives, an operator-controlled element shiftable to a plurality of stations of transmission control, a plurality of electrical switches arranged in series and respectively operably associated with each of said stations, each of said switches having a movable contact member actuated into open-switch position by said element when positioned at an associated station, the contacts of each of said switches being moved to closed-switch position during shifting movements of said shiftable element, a fluid pressure operated motor, a valve controlling delivery of fluid under pressure to said motor, means acting to maintain said valve in position to deliver said fluid to said motor when said shiftable element is positioned at each of said stations, a solenoid operably connected to said valve and adapted when energized to position said valve to prevent said fluid delivery to said motor, electrical circuit means including said switches and said solenoid, and mechanism mechanically connected to said element and operable in response to shifting of said shiftable element to selectively establish operable connection between said motor and said plurality of element-engaging means.

39. In a motor vehicle transmission according to claim 37 wherein, said electrical circuit means comprises primary and secondary electrical circuits and switch means operable by energizing said primary circuit for closing said secondary circuit, said primary circuit including the electrical switch and said secondary circuit including the solenoid.

40. In a motor vehicle transmission having a plurality of speed ratio controlling devices, a driver-operable element shiftable to a plurality of stations of vehicle drive control, means operable in response to shift of said element for selectively operating said devices, an illuminator positioned to disclose the stations of shift for said element, and electrically operating means for energizing said illuminator in response to shifting of said element from each of said stations toward another and for deenergizing said illuminator when said shiftable element is positioned at each of said stations for normal vehicle drive.

41. In a motor vehicle having an engine and a planetary gear transmission providing a plurality of forwardly driving speed ratios, a fluid coupling operably connecting said engine and transmission, a manually adjustable selector element, power applying means for manipulating said transmission to selectively provide said forwardly driving speed ratios in direct response to manual adjustment of said selector element, and engine accelerator and vehicle brake pedals respectively disposed for operation by the right foot and left foot of the vehicle driver, said pedals and selector element constituting the driver operable controls for accelerating the vehicle selectively in said speed ratios and for bringing the vehicle to rest.

42. In a motor vehicle power transmission, a rotatable transmission drive controlling member, a device adapted to frictionally engage said rotatable drive controlling member, a pressure fluid operable motor adapted to operate said device in frictional engagement with said rotatable drive controlling member, means for supplying liquid fluid under pressure for delivery to said motor, valving means controlling the delivery of said pressure fluid to said motor for controlling engagement and release of said frictionally engageable device, a solenoid operably connected to said valving means and adapted when energized to operate said valving means to effect release of said frictionally engageable device, a selector element manually shiftable to a plurality of stations of transmission drive control, additional transmission drive control devices adapted for selective manipulation in response to shift of said selector element, and means operating in response to shift of said selector element to effect energization of said solenoid to bring about the release of said frictionally engageable device as aforesaid and manipulation of one of said additional transmission drive control devices.

43. In a motor vehicle power transmission, a rotatable transmission drive controlling member, a device adapted to frictionally engage said rotatable drive controlling member, a pressure fluid operable motor adapted to operate said device in frictional engagement with said rotatable drive controlling member, means for supplying liquid fluid under pressure for delivery to said motor, valving means controlling the delivery of said pressure fluid to said motor for controlling engagement and release of said frictionally engageable device, a solenoid operably connected to said valving means and adapted when energized to operate said valving means to effect release of said frictionally engageable device, a selector element manually shiftable to a plurality of stations of transmission drive control, additional transmission drive control devices adapted for selective manipulation in response to shift of said selector element, a switch controlling energization of said solenoid and adapted for operation in response to shift of said selector element between each of said drive control stations, and means operating in response to shift of said selector element between each of said drive control stations for operating said switch to bring about the release of said frictionally engageable devices as aforesaid and to thereafter effect manipulation of one of said additional transmission drive control devices.

44. In a motor vehicle power transmission, a driving shaft, a driven shaft, planetary gearing operable between said shafts, clutch means operable to lock said gearing for direct drive of the driven shaft from the driving shaft, said gearing including a rotatable part thereof adapted to be held for driving the driven shaft from and at a speed different than that of said driving shaft, means operable to hold said rotatable part when said clutch means is released, a pressure fluid operable motor adapted to operate said clutch means, means for supplying liquid fluid under pressure for delivery to said motor, valving means controlling the delivery of said pressure fluid to said motor for controlling engagement and release of said clutch means, a solenoid operably connected to said valving means and adapted when energized to operate said valving means to effect release of said clutch means, a vehicle-driver-operable control element adapted for movement selectively between a plurality of predetermined stations of transmission drive control and means operating in response to movement of said element from one of said stations to another for effecting energization of said solenoid thereby to release the direct drive and thereafterward for causing operation of said holding means to produce said speed different drive.

45. In a motor vehicle transmission; a driver operated selector element; means for mounting said selector element for shifting movements between predetermined stations of transmission control; and means operating in response to shift of said selector element for manipulating the transmission to change the vehicle drive, said operating means including a fluid-delivery control valve, a solenoid for operating said valve, an electrical circuit for said solenoid, a switch including a movable element for controlling said circuit, and means for mounting said switch element for operation in response to shift of said selector element for closing said circuit during shift movements of said selector element and for opening said circuit when said selector element is disposed at said stations.

46. In a power transmission, a plurality of speed ratio controlling devices, means for selectively operating said devices including a power operator, a selector element adapted for shifting movement to a plurality of stations of transmission control, electrical switch-controlled means for controlling operation of said power operator in response to shifting movements of said selector element, a switch having a movable operating member for controlling energization of said electrical means, and means for supporting said operating member for movement in response to shifting movements of said selector element between said plurality of stations.

CARL A. NERACHER.
TENO IAVELLI.